United States Patent
Qin (10) Patent No.: US 10,295,835 B2
(45) Date of Patent: May 21, 2019

(54) STEREOSCOPIC DISPLAY DEVICE COMPRISING AT LEAST TWO ACTIVE SCATTERING PANELS ARRANGED IN DIFFERENT PLANES EACH HAVING A SCATTERING FUNCTION AND A TRANSMISSION FUNCTION AND STEREOSCOPIC DISPLAY METHOD

(71) Applicant: BOE Technology Group Co., Ltd., Beijing (CN)

(72) Inventor: Guangkui Qin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 547 days.

(21) Appl. No.: 14/770,928

(22) PCT Filed: Dec. 17, 2014

(86) PCT No.: PCT/CN2014/094082
§ 371 (c)(1),
(2) Date: Aug. 27, 2015

(87) PCT Pub. No.: WO2016/011770
PCT Pub. Date: Jan. 28, 2016

(65) Prior Publication Data
US 2016/0195730 A1 Jul. 7, 2016

(30) Foreign Application Priority Data
Jul. 23, 2014 (CN) .......................... 2014 1 0354062

(51) Int. Cl.
*F21V 8/00* (2006.01)
*G02F 1/31* (2006.01)
(Continued)

(52) U.S. Cl.
CPC ......... *G02B 27/2278* (2013.01); *G02B 6/005* (2013.01); *G02B 27/22* (2013.01);
(Continued)

(58) Field of Classification Search
CPC .......................... G02B 27/22; G02B 27/2228; G02B 27/2278; H04N 13/0495; H04N 13/395; G02F 1/31
See application file for complete search history.

(56) References Cited

U.S. PATENT DOCUMENTS

| | | | |
|---|---|---|---|
| 8,816,578 B1 * | 8/2014 | Peng ................. | G02F 1/133502 313/478 |
| 2005/0062905 A1 * | 3/2005 | Kim ..................... | G02F 1/1323 349/95 |

(Continued)

FOREIGN PATENT DOCUMENTS

| | | |
|---|---|---|
| CN | 1294695 A | 5/2001 |
| CN | 1504803 A | 6/2004 |

(Continued)

OTHER PUBLICATIONS

Apr. 29, 2015—International Search Report and Written Opinion Appn PCT/CN2014/094082 with English Tran.
(Continued)

*Primary Examiner* — Paul C Lee
(74) *Attorney, Agent, or Firm* — Banner & Witcoff, Ltd.

(57) ABSTRACT

A stereoscopic display device and a stereoscopic display method are provided. The stereoscopic display device comprises: a display unit configured for displaying an image and emitting emergent light; and at least two active scattering panels arranged at a light-emitting side of the display unit and in different planes. The active scattering panels are configured for performing a scattering process to the emergent light, so that the emergent light, after being scattered by the different active scattering panels, forms a stereoscopic
(Continued)

picture. By providing a plurality of active scattering panels to achieve stereoscopic display without the provision of a plurality of display panels, it is possible to avoid the problem that backlight emitted by a backlight source is subjected to a serious reduction in transmittance after passing through a plurality of layers of display panels, thereby improving display brightness of a stereoscopic display device.

16 Claims, 4 Drawing Sheets

(51) Int. Cl.
    *G02B 27/22*     (2018.01)
    *G02F 1/1334*     (2006.01)
    *H04N 13/395*     (2018.01)

(52) U.S. Cl.
    CPC ....... *G02B 27/2228* (2013.01); *G02F 1/1334* (2013.01); *G02F 1/31* (2013.01); *H04N 13/395* (2018.05); *G02B 27/2214* (2013.01)

(56) References Cited

U.S. PATENT DOCUMENTS

| | | | |
|---|---|---|---|
| 2006/0176541 A1* | 8/2006 | Woodgate | G02B 27/2214 359/237 |
| 2007/0058127 A1* | 3/2007 | Mather | G02B 27/2214 349/159 |
| 2011/0310121 A1 | 12/2011 | Baron | |
| 2012/0320171 A1* | 12/2012 | Lee | G02B 27/2214 348/54 |
| 2013/0082986 A1* | 4/2013 | Yamauchi | G02F 1/1334 345/204 |

FOREIGN PATENT DOCUMENTS

| | | |
|---|---|---|
| CN | 1526243 A | 9/2004 |
| CN | 1965590 A | 5/2007 |
| CN | 101526674 A | 9/2009 |
| CN | 103185984 A | 7/2013 |
| CN | 203037987 U | 7/2013 |
| CN | 103885117 A | 6/2014 |
| CN | 104159100 A | 11/2014 |
| JP | 2000075243 A * | 3/2000 |
| JP | 2005024764 A | 1/2005 |
| WO | 2012102577 A2 | 8/2012 |
| WO | 2013180737 A1 | 12/2013 |

OTHER PUBLICATIONS

Sep. 30, 2015—First Office Action Appn 201410354062.2 with English Tran.
Jan. 13, 2016—(CN)—Second Office Action Appl 201410354062.2 with English Tran.
Apr. 19, 2016—(CN)—Third Office Action Appn 201410354062.2 with English Tran.
Aug. 22, 2016—(CN)—Fourth Office Action Appn 201410354062.2 with English Tran.

* cited by examiner

STEREOSCOPIC DISPLAY DEVICE COMPRISING AT LEAST TWO ACTIVE SCATTERING PANELS ARRANGED IN DIFFERENT PLANES EACH HAVING A SCATTERING FUNCTION AND A TRANSMISSION FUNCTION AND STEREOSCOPIC DISPLAY METHOD

TECHNICAL FIELD

Embodiments of present disclosure relate to a stereoscopic display device and a stereoscopic display method.

BACKGROUND

For the present, conventional 3D (three dimensional) stereoscopic display techniques may be distinguished into two main categories, i.e., the spectacle type 3D and the naked-eye type 3D. However, both the naked-eye type 3D and the spectacle type 3D display techniques utilize the parallax of the human eyes to achieve a 3D presentation, and therefore, are also called pseudo-3D. True-3D techniques mainly comprise the holographic imaging technology, the integrated imaging technology and the spatial 3D technology etc, the holographic imaging technology and the integrated imaging technology are relatively complicated, and the spatial 3D technology has a relatively simple manner in its implementation.

Figure 1:
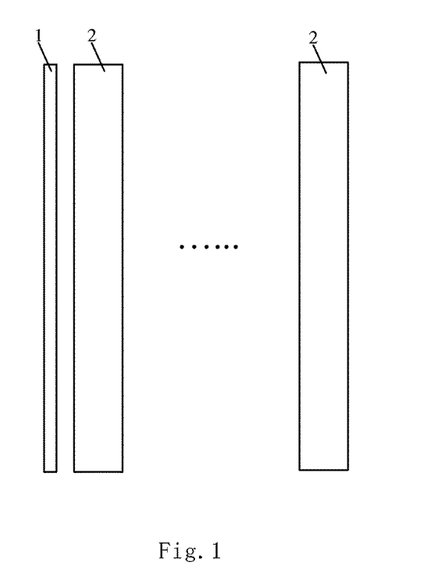
FIG. 1 is a structural schematic view of a current stereoscopic display device.

FIG. 1 is a schematic structural view illustrating a current stereoscopic display device. As illustrated in FIG. 1, the stereoscopic display device comprises a backlight source 1 and a plurality of layers of display panels 2 arranged in front of the backlight source 1, and the plurality of layers of display panels is arranged to be overlapped with each other. Because the display panels 2 are arranged in different planes, the pictures displayed by the different display panels 2 are located in different planes, so as to form a stereoscopic picture.

A true-3D display technique as described above is achieved by using the plurality of layers of display panels. However, due to the fact that the plurality of layers of display panels are arranged to be overlapped with each other, the light emitted by the backlight source is subjected to a severe reduction in transmittance after passing through the plurality of layers of display panels, and this causes the stereoscopic display device to have decreased display brightness.

SUMMARY

Embodiments of present disclosure provide a stereoscopic display device and a stereoscopic display method for improving the display brightness of the stereoscopic display device.

On one hand, an embodiment of present disclosure provides a stereoscopic display device, which comprises a display unit configured for displaying an image and emitting emergent light; and at least two active scattering panels arranged at a light-emitting side of the display unit and in different planes, the active scattering panels are configured for performing a scattering process to the emergent light, so that the emergent light, after being scattered by the different active scattering panels, forms a stereoscopic picture.

On the other hand, an embodiment of present disclosure provides a stereoscopic display method for a stereoscopic display device; the stereoscopic display device comprises a display unit configured for displaying an image and emitting emergent light, and at least two active scattering panels arranged at a light-emitting side of the display unit and in different planes, the active scattering panels are configured for performing a scattering process to the emergent light, so that the emergent light, after being scattered by the different active scattering panels, forms a stereoscopic picture; and the method comprises: controlling the display unit to display the image and to emit the emergent light which has an identical exit direction, and inputting a driving signal to each of the active scattering panels so that each of the active scattering panels performs the scattering process to the emergent light, and that the emergent light, after being scattered by the different active scattering panels, forms the stereoscopic picture.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 3b is a principle schematic view of the backlight source of FIG. 3a;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In the following, detailed description for a stereoscopic display device and a stereoscopic display method provided by embodiments of present disclosure will be made in conjunction with drawings.

Figure 2:
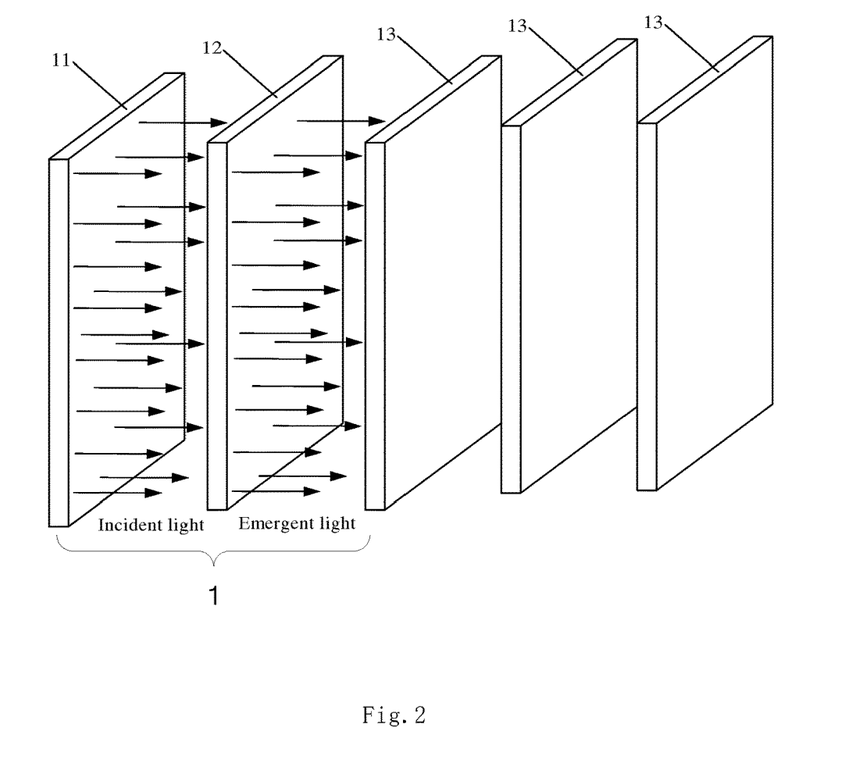
FIG. 2 is a structural schematic view of a stereoscopic display device according to an embodiment of present disclosure.

FIG. 2 is a structural schematic view of a stereoscopic display device provided by an embodiment of present disclosure. As illustrated in FIG. 2, the stereoscopic display device comprises: a display unit 1 configured for displaying an image and emitting emergent light; and at least two active scattering panels 13 located at a light-emitting side of the display unit 1 and in different planes.

As an example, the emergent light emitted by the display unit 1 has an identical exit direction, that is to say, the emergent light comprises parallel light; and the active scattering panels 13 are configured to perform a scattering process to the emergent light, so that the emergent light, after the scattering of the different active scattering panels 13, forms a stereoscopic picture.

As an example, an exit direction of the emergent light is perpendicular to a light-incident surface and a light-emitting surface, of the display unit.

In the present embodiment, the display unit 1 can comprise a backlight source 11 and a display panel 12, the backlight source 11 is arranged at a light-incident side of the display panel 12, and the at least two active scattering panels 13 are arranged at a light-emitting side of the display panel 12. The backlight source 11 is configured to supply incident light to the display panel 12, the incident light has an identical incident direction, that is to say, the incident light comprises parallel light; the display panel 12 is configured to, according to the incident light, display the image and emit the emergent light; and the active scattering panels 13 are configured to perform a scattering process to the emergent light, so that the emergent light, after being scattered by the different active scattering panels 13, forms a stereoscopic picture. In the present embodiment, the display panel 12 can be a liquid crystal display panel.

The number of the active scattering panels 13 is at least two, that is to say, at least two active scattering panels 13 are provided at the light-emitting side of the display panel 12, in such a way that the stereoscopic picture can be obtained. In FIG. 1 of this embodiment, description is made taking three active scattering panels 13 as an example, and in practical situations, other quantities of active scattering panels 13 can also be used.

As an example, in the present embodiment, the incident direction of the incident light emitted by the backlight source 11 needs to be identical, that is, the incident light needs to incident onto the display panel 12 in an identical incident direction. Here, the exit direction of the emergent light is identical to the incident direction of the incident light. The incident direction of the incident light is perpendicular to the light-incident surface of the display panel 12. In the present embodiment, in order to achieve that the incident direction of the incident light is perpendicular to the display panel 12, for example, the divergence angle of the incident light is greater than −5° and smaller than 5°.

As an example, the backlight source 11 can be obtained in the following three manners.

Figure 3A:
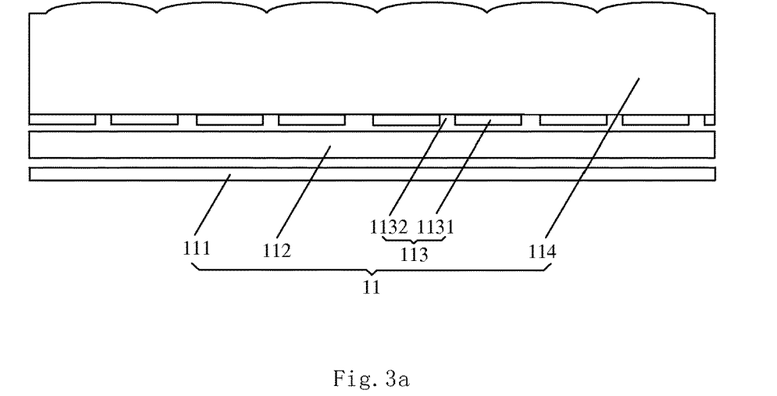
FIG. 3a is a structural schematic view of a backlight source according to an embodiment of present disclosure.
Figure 3B:
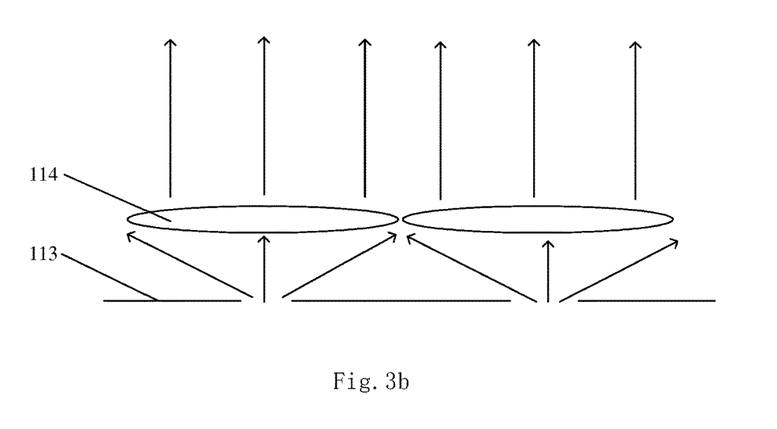

Alternatively, the first manner employs a lenticule technology. FIG. 3a is an exemplary structural schematic view of the backlight source according to an embodiment of present disclosure, and FIG. 3b is a principle schematic view of the backlight source of FIG. 3a. As illustrated in FIGS. 3a and 3b, the backlight source 11 can comprise a light source 111, a light guide plate 112, a point light source array 113 and a lenticule array 114 that are arranged successively. In the structure of the backlight source 11, the light source 111 is provided to be away from the display panel 12, and the lenticule array 114 is provided to be adjacent to the display panel 12. The light source 111 is configured to supply a primary light source to the light guide plate 112, the light guide plate 112 is configured for receiving the primary light source and providing an export light to the point light source array 113, the point light source array 13 is configured to convert the export light into a point light source, and output the light emitted by the point light source to the lenticule array 114, and the lenticule array 114 is configured to convert the light emitted by the point light source into parallel incident light, and provide the incident light to the display panel 12. As an example, the point light source array 113 comprises a plurality of barriers 1131, a spacing 1132 is formed between adjacent barriers 1131, and in a situation where the export light is shined onto the point light source array 113, the barriers 1131 block the export light, and the export light can pass through the spacing 1132 so as to be converted into light like the one emitted from a point light source.

As an example, the plurality of barriers 1131 are arranged in a matrix manner, and are made of a light-tight material, such as, metal.

As an example, the primary light source is a line light source, and the export light source provided by the light guide plate 112 is a surface light source.

Figure 4:
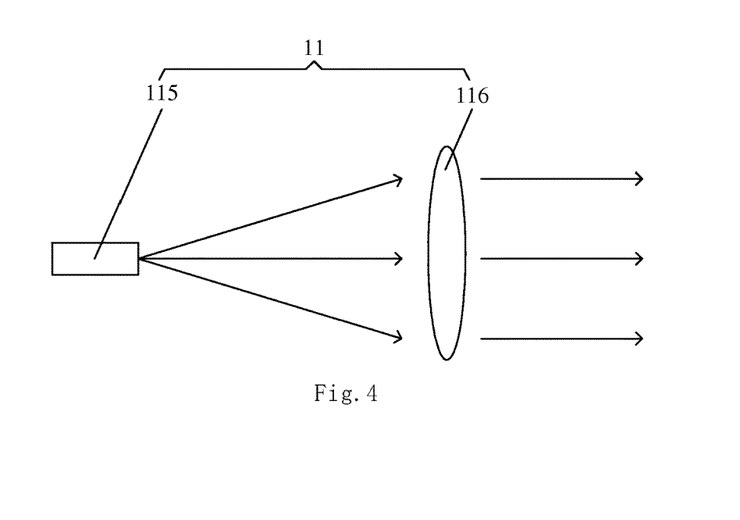
FIG. 4 is a structural schematic view of another backlight source according to an embodiment of present disclosure.

Alternatively, the second manner employs a laser projective technology. FIG. 4 is another structural schematic view of the backlight source according to an embodiment of present disclosure. As illustrated in FIG. 4, the backlight source 11 comprises a light source 115 and a lens 116. In the structure of the backlight source 11, the light source 115 is located away from the display panel 12 and the lens 116 is located adjacent to the display panel 12. The light source 115 is configured to provide a laser light source to the lens 116, and the lens 116 is configured to convert the laser light source into the incident light and supply the incident light to the display panel 12.

Figure 5:
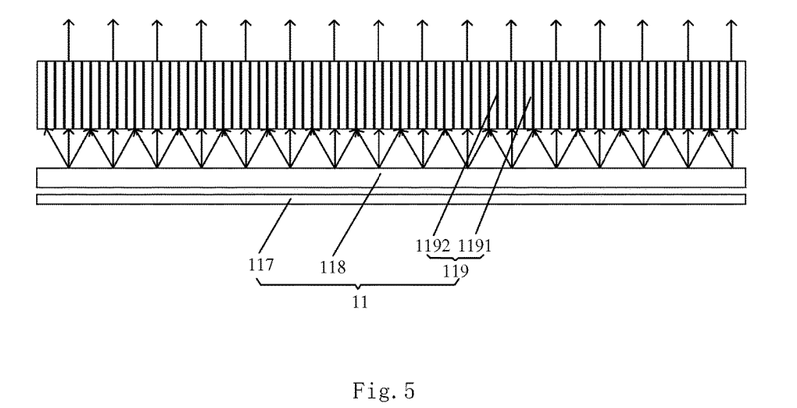
FIG. 5 is a structural schematic view of still another backlight source according to an embodiment of present disclosure.

Alternatively, the third manner employs a louver filtering technology. FIG. 5 is another structural schematic view of the backlight source according to an embodiment of present disclosure. As illustrated in FIG. 5, the backlight source 11 comprises a light source 117, a light guide plate 118 and a louver filter layer 119 that are arranged successively. In the structure of the backlight source 11, the light source 117 is located away from the display panel 12 and the louver filter layer 119 is located adjacent to the display panel 12. The light source 117 is configured to provide a primary light source to the light guide plate 118, the light guide plate 118 is configured to receive the primary light source and provide an export light source to the louver filter layer 119, and the louver filter layer 119 is configured to convert the export light source into the incident light parallel with each other, and provide the incident light to the display panel 12.

As an example, the louver filter layer 119 comprises a plurality of transparent structures 1191 and a plurality of black structures 1192, arranged alternately with each other, and in a situation where the export light is shined onto the louver filter layer 119, the export light, direction of which is identical to that of the transparent structures 1191 and the black structures 1192, passes through the louver filter layer 119, so as to form the incident light. As an example, the export light can pass through the transparent structure 1191 so as to form the incident light, the transmitted light mainly focuses in the normal direction. Here, as an example, the primary light source is a line light source and the export light is a surface light source.

In the present embodiment, the material for forming the active scattering panels 13 can comprise polymer dispersed liquid crystal (abbreviated by PDLC), bistable cholesteric phase liquid crystal or polymerstabilized cholesteric texture (abbreviated by PSCT). Or, the active scattering panels 13 can also employ other materials having both a scattering feature and a transmission feature, and which will not be listed in detail herein.

In the present embodiment, as an example, the active scattering panels 13 are parallel to the display panel 12, and the active scattering panels 13 are also arranged to be parallel to each other.

In the present embodiment, each of the active scattering panels 13 comprises a plurality of the scattering parts that are controlled separately, and each of the scattering parts can be turned on under the driving action of a driving signal, or be turned off in a situation of not being applied with a driving signal. When the scattering part is turned on, the scattering part can perform a scattering process to the emergent light emitted by the display unit, that is to say, presenting a scattering function; and when the scattering part is turned off, the scattering part allows the emergent light to pass and does not scatter the emergent light, that is, presenting a transmission function. Each scattering part can correspond to one or more pixels of the display panel 12. In practice, it is possible to control the scattering part corresponding to a pixel to turn on or off, so as to achieve the stereoscopic display.

As an example, when the stereoscopic display device according to the embodiments of present disclosure performs a 3D presentation, the combination of scattering parts, of the at least two active scattering panels, being turned on corresponds to the entire display panel, and the scattering parts, of each of the active scattering panels, being turned on can have no overlap therebetween.

Figure 6:
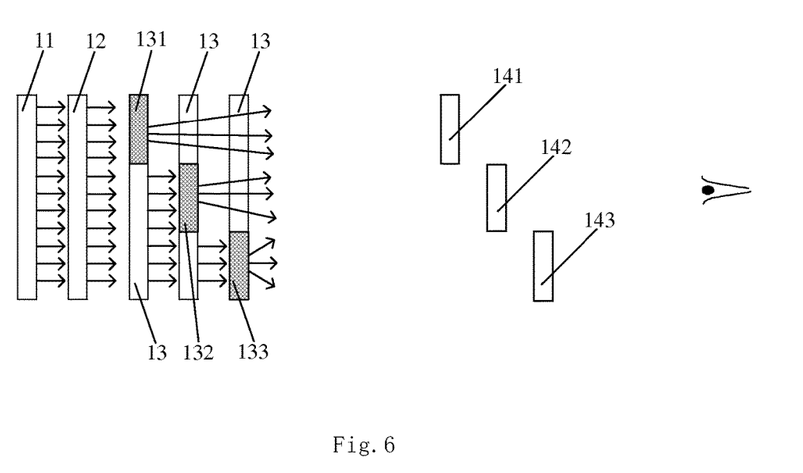
FIG. 6 is a principle schematic view of a stereoscopic display device according to an embodiment of present disclosure.

In the following, a detailed description about the working principle of the stereoscopic display device in the above embodiments will be made referring to FIG. 6. FIG. 6 is a principle schematic view of a stereoscopic display device according to an embodiment of present disclosure. As illustrated in FIG. 6, the backlight source 11 emits incident light toward the display panel 12, and the incident light has an identical incident direction. The display panel 12 displays an image and emits emergent light, according to the incident light, and in this situation, the image displayed by the display panel 12 is a plan view image. The exit direction of the emergent light is identical to the incident direction of the incident light, because the incident light has the identical incident direction, the exit direction of the emergent light is also identical, thereby it is possible to better control the emergent light scattered by the active scattering panels 13. The emergent light beats is shined onto three active scattering panels 13, and different active scattering panels 13 are configured to scatter different parts of the emergent light, that is, different active scattering panels 13 are configured to scatter different parts of the image displayed by the display panel 12.

As an example, the active scattering panel 13 adjacent to the display panel 12 is taken as the first active scattering panel 13, and the active scattering panel 13 located at an intermediate position is taken as the second active scattering panel 13, and the active scattering panel 13 provided to be away from the display panel 12 is taken as the third active scattering panel 13; and the emergent light is divided into upper emergent light, middle emergent light, and lower emergent light. The first active scattering panel 13 is configured to scatter the upper emergent light to form an upper image 141, as an example, a scattering part 131 of the first active scattering panel 13 is turned on, this scattering part 131 scatters the upper emergent light to form the upper image 141, and the scattering part 131 can correspond to one or more pixels of the display panel 12; the second active scattering panel 13 is configured to scatter the middle emergent light to form an middle image 142, as an example, a scattering part 132 of the second active scattering panel 13 is turned on, this scattering part 132 scatters the middle emergent light to form the middle image 142, and the scattering part 132 can correspond to one or more pixels of the display panel 12; and the third active scattering panel 13 is configured to scatter the lower emergent light to form a lower image 143, as an example, a scattering part 133 of the third active scattering panel 13 is turned on, this scattering part 133 scatters the lower emergent light to form the lower image 143, and the scattering part 133 can correspond to one or more pixels of the display panel 12. Because the first active scattering panel 13, the second active scattering panel 13 and the third active scattering panel 13 are located in different planes, the upper image 141, the middle image 142, and the lower image 143 are also located in different planes, and thus the combination of the upper image 141, the middle image 142 and the lower image 143 forms a stereoscopic picture visible to human eyes.

In the stereoscopic display device provided by embodiments of present disclosure, the backlight source is arranged at the light-incident side of the display panel, the at least two active scattering panels are arranged at the light-emitting side of the display panel and in different planes, the active scattering panels can perform a scattering process to the emergent light emitted by the display panel, so that the emergent light, after being scattered by different active scattering panels, forms a stereoscopic picture. By providing a plurality of active scattering panels to achieve displaying a stereoscopic image without the provision of a plurality of display panels, the embodiments avoid the problem that backlight emitted by the backlight source is subjected to a severe reduction in transmittance after passing through a plurality of layers of display panels, and thus improves the display brightness of a stereoscopic display device.

Figure 7:
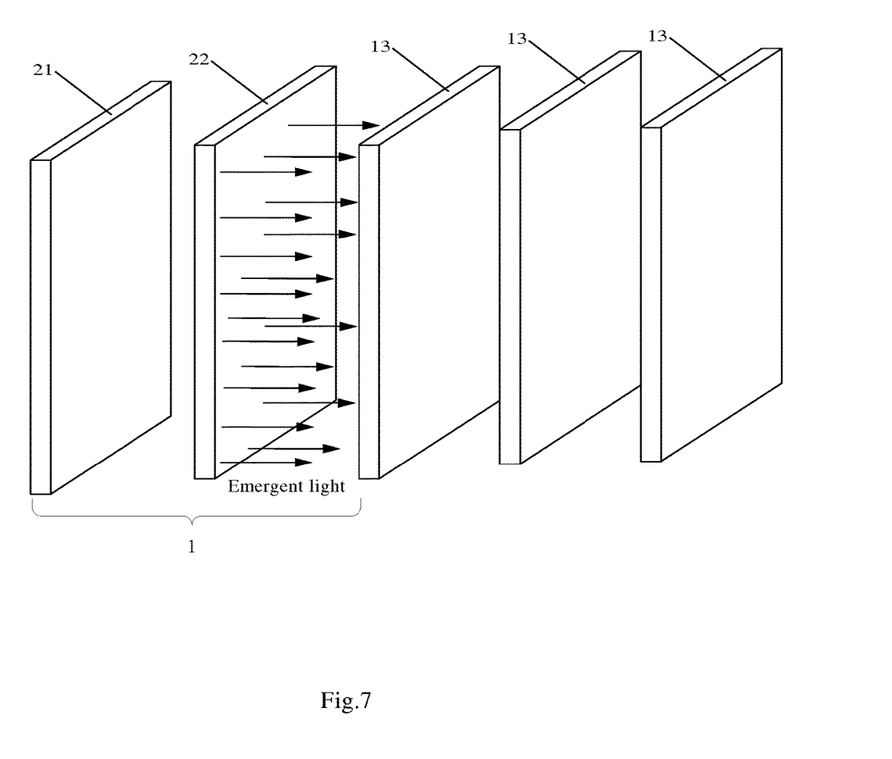
FIG. 7 is a structural schematic view of another stereoscopic display device according to an embodiment of present disclosure.

FIG. 7 is a structural schematic view of another stereoscopic display device provided by an embodiment of present disclosure. As illustrated in FIG. 7, the stereoscopic display device provided by this embodiment is distinguished from the above embodiment in that the display unit 1 comprises a display panel 21 and an optical lens matrix 22, the optical lens matrix 22 is arranged at the light-emitting side of the display panel 21, and the at least two active scattering panels 13 are provided at the light-emitting side of the optical lens matrix 22.

The display panel 21 can be an OLED (Organic Light-Emitting Diode) display panel.

The optical lens matrix 22 can convert the light directions of an original light into an identical direction, such an identical direction is the exit direction of the emergent light, that is to say, converting the original light into the emergent light. As an example, the optical lens matrix 22 can converge the original light so as to form the emergent light. The optical lens matrix 22 can allow the light emitted by the display panel 21 to be shined onto the active scattering panels 13 in an identical exit direction, namely, allowing the emergent light to have an identical exit direction.

Descriptions about the structure and function of the active scattering panels 13 can refer to the above embodiment, and repeated description is omitted herein.

In the stereoscopic display device provided by embodiments of present disclosure, the optical lens matrix is arranged at the light-incident side of the display panel, the at least two active scattering panels are arranged at the light-emitting side of the optical lens matrix and in different planes, the active scattering panels can perform a scattering process to the emergent light emitted by the optical lens matrix, so that the emergent light, after being scattered by the different active scattering panels, forms a stereoscopic picture. By providing a plurality of active scattering panels to achieve displaying a stereoscopic image without the provision of a plurality of display panels, the embodiments avoid the problem that backlight emitted by a backlight source is subjected to a severe reduction in transmittance after passing through a plurality of layers of display panels, and thus improves display brightness of a stereoscopic display device.

Embodiments of present disclosure also provide a stereoscopic display method based on a stereoscopic display device, the stereoscopic display device comprises a display unit and at least two active scattering panels, and the at least two active scattering panels are arranged at a light-emitting side of the display unit and in different planes. The stereoscopic display method provided by the embodiments of present disclosure comprises:

Step 101, controlling the display unit to display an image and to emit emergent light, the emergent light having an identical exit direction;

Step 102, inputting a driving signal to each of a plurality of active scattering panels so that each of the active scattering panels performs a scattering process to the emergent light, and that the emergent light, after being scattered by the different active scattering panels, forms a stereoscopic picture.

As an example, each of the active scattering panels comprises a plurality of scattering parts that are controlled separately; and each of the plurality of scattering parts has a scattering function in a situation of being applied with a driving signal, and has a transmission function in a situation of being applied with no driving signal.

As an example, inputting of the driving signal to each of the active scattering panels so that each of the active scattering panels performs a scattering process to the emergent light, and that the light, after being scattered by the different active scattering panels, forms the stereoscopic picture, comprises: inputting the driving signal to different scattering parts of each of the active scattering panels, so that the light scattered by different scattering parts of each of the active scattering panels forms the stereoscopic picture.

As an example, the different scattering parts means the scattering parts having no overlap in the traveling direction of the emergent light, and the combination of the different scattering parts, of the active scattering panels, being turned on correspond to the entire display panel.

As an example, the material for forming the active scattering panels comprises polymer dispersed liquid crystal, bistable cholesteric phase liquid crystal or polymerstabilized cholesteric texture.

As an example, the active scattering panel can be similar to a liquid crystal display device in structure, comprise substrates opposing to each other and polymer dispersed liquid crystal, bistable cholesteric phase liquid crystal or polymerstabilized cholesteric texture sandwiched between the substrates, and be divided into a plurality of zones, each of which comprises a switching element, for example, a thin film transistor or the like, and their structures will not be described in detail herein for the purpose of simplicity.

The stereoscopic display method provided by the embodiment can be applied to the stereoscopic display device provided in the above embodiments, specific descriptions about the stereoscopic display device can refer to the above embodiments, and repeated description thereof is omitted herein.

In the stereoscopic display method provided by the embodiments of present disclosure, at least two active scattering panels are arranged at the light-emitting side of the display panel and in different planes, the active scattering panels can perform a scattering process to the emergent light emitted by the display panel, so that the emergent light, after being scattered by the different active scattering panels, forms a stereoscopic picture. In the embodiments, by providing a plurality of active scattering panels to achieve displaying a stereoscopic image without the provision of a plurality of display panels, it is possible to avoid the problem that backlight emitted by a backlight source is subjected to a severe reduction in transmittance after passing through a plurality of layers of display panels, and this improves the display brightness of a stereoscopic display device.

It's to be understood that the above embodiments are only exemplary embodiments used for explaining the principle of the present disclosure; however, the present disclosure is not limited thereto. Various modifications and improvements may be made by the ordinary skilled in this art without departing from the spirit and essence of the present disclosure, and all of the modifications and improvements are construed as the protective scope of the present disclosure.

The present application claims the priority of the Chinese Patent Application No. 201410354062.2, filed on Jul. 23, 2014, the entirety of which is incorporated herein by reference as a part of the present application.

What is claimed is:

1. A stereoscopic display device, comprising:
   a display unit, comprising display panel, wherein the display panel is configured for displaying an image and emitting emergent light; and
   at least two active scattering panels, arranged at a light-emitting side of the display panel and in different planes,
   wherein
   each of the at least two active scattering panel comprises a plurality of scattering parts that are controlled separately, each of the plurality of scattering parts has a scattering function in a situation of being applied with a driving signal so as to perform a scattering process to the emergent light to display a portion of the image displayed by the display panel, and has a transmission function in a situation of being applied with no driving signal;
   at least one of the plurality of scattering parts of each of the active scattering panels is configured to have the scattering function, and the scattering parts having the scattering function, of the at least two active scattering panels are configured to perform the scattering function at a same time so as perform the scattering process respectively to different parts of the emergent light to respectively display different portions of a same image displayed by the display panel; and
   a region consisting of orthographic projections of all the scattering parts, having the scattering function, of the at least two active scattering panels, on the display panel overlaps the whole display panel, and the scattering parts, having the scattering function, of the at least two active scattering panels do not overlap with each other in a traveling direction of the emergent light, so that the emergent light, after being scattered by the scattering parts, having the scattering function, of the at least two active scattering panels at the same time, forms a stereoscopic picture.

2. The stereoscopic display device according to claim 1, wherein the emergent light comprises parallel light.

3. The stereoscopic display device according to claim 1, wherein an exit direction of the emergent light is perpendicular to a light-emitting surface of the display unit.

4. The stereoscopic display device according to claim 1, wherein the display unit further comprises:
a backlight source, arranged at a light-incident side of the display panel, configured for providing incident light to the display panel, wherein the incident light has an identical incident direction, and the display panel is configured for, based on the incident light, displaying the image and emitting the emergent light.

5. The stereoscopic display device according to claim 4, wherein the backlight source comprises a light source, a light guide plate, a point light source array and a lenticule array that are arranged successively, the light source is arranged away from the display panel, and the lenticule array is arranged adjacent to the display panel;
the light source is configured for providing a primary light source to the light guide plate;
the light guide plate is configured for receiving light emitted by the primary light source and providing an export light source to the point light source array;
the point light source array is configured for converting the export light source into a point light source, and for outputting light emitted by the point light source to the lenticule array; and
the lenticule array is configured for converting the light emitted by the point light source into the incident light and providing the incident light to the display panel.

6. The stereoscopic display device according to claim 4, wherein the backlight source comprises a light source arranged away from the display panel and a lens arranged adjacent to the display panel;
the light source is configured for providing a laser light source to the lens; and
the lens is configured for converting light emitted by the laser light source into the incident light and providing the incident light to the display panel.

7. The stereoscopic display device according to claim 4, wherein the backlight source comprises a light source, a light guide plate and a louver filter layer that are arranged successively, the light source is arranged away from the display panel and the louver filter layer is arranged adjacent to the display panel;
the light source is configured for providing a primary light source to the light guide plate;
the light guide plate is configured for receiving light emitted by the primary light source and providing an export light source to the louver filter layer; and
the louver filter layer is configured for converting light emitted by the export light source into the incident light, and providing the incident light to the display panel.

8. The stereoscopic display device according to claim 1, wherein the display panel is configured to generate original light, and the display unit further comprises:
an optical lens matrix, arranged at the light-emitting side of the display panel, and configured to convert the original light into the emergent light,
wherein the at least two active scattering panels are provided at a light-emitting side of the optical lens matrix.

9. The stereoscopic display device according to claim 1, wherein a material for forming the active scattering panels comprises polymer dispersed liquid crystal, bistable cholesteric phase liquid crystal or polymerstabilized cholesteric texture.

10. The stereoscopic display device according to claim 4, wherein the active scattering panels are arranged to be parallel to the display panel.

11. The stereoscopic display device according to claim 8, wherein the display panel comprises an organic light-emitting display panel.

12. The stereoscopic display device according to claim 5, wherein the point light source array comprises a plurality of barriers arranged to be spaced apart from each other, and each of the barriers is made of a light-tight material.

13. The stereoscopic display device according to claim 7, wherein the louver filter layer comprises a plurality of transparent structures and a plurality of black structures, and the plurality of transparent structures and the plurality of black structures are arranged alternately with each other.

14. The stereoscopic display device according to claim 1, wherein each of the plurality of the scattering parts corresponds to one or more pixels of the display panel.

15. A stereoscopic display method for a stereoscopic display device, wherein the stereoscopic display device comprises: a display unit, comprising a display panel, wherein the display panel is configured for displaying an image and emitting emergent light; and at least two active scattering panels arranged at a light-emitting side of the display panel and in different planes, wherein each of the at least two active scattering panels comprising a plurality of scattering parts that are controlled separately, each of the plurality of scattering parts has a scattering function in a situation of being applied with a driving signal, so as to perform a scattering process to the emergent light to display a portion of the image displayed by the display panel, and has a transmission function in a situation of being applied with no driving signal, the method comprising:
controlling the display panel to display the image and to emit the emergent light which has an identical exit direction; and
inputting the driving signal to at least one of the plurality of scattering parts of each of the active scattering panels so that the at least one of the plurality of scattering parts of each of the active scattering panels has the scattering function, wherein driving signals are input respectively to the scattering parts, having the scattering function, of the at least two active scattering panels at a same time so that the scattering parts, having the scattering function, of the at least two active scattering panels perform the scattering function at the same time to perform the scattering process respectively to different parts of the emergent light to respectively display different portions of a same image displayed by the display panel,
wherein a region consisting of orthographic projections of all the scattering parts, having the scattering function, of the at least two active scattering panels, on the display panel overlaps the whole display panel, and the scattering parts, having the scattering function, of the at least two active scattering panels, do not overlap with each other in a traveling direction of the emergent light, so that the emergent light, after being scattering by the scattering parts, having the scattering function, of the at least two active scattering panels at the same time, forms a stereoscopic picture.

16. The stereoscopic display method according to claim 15, wherein a material for forming the active scattering panels comprises polymer dispersed liquid crystal, bistable cholesteric phase liquid crystal or polymerstabilized cholesteric texture.

* * * * *